UNITED STATES PATENT OFFICE 2,491,843

LIQUID LINEAR METHYLPOLYSILOXANES

Donald F. Wilcock, Saugus, Mass., assignor to General Electric Company, a corporation of New York No Drawing. Application March 21, 1946, Serial No. 656,162

4 Claims. (Cl. 260—448.2)

This invention relates to new and useful synthetic liquid compositions or oils. More particularly, the invention is concerned with fluid or oily compositions comprising a liquid mixture of linear methylpolysiloxanes wherein at least some of the silicon atoms intermediate the terminal silicon atoms have a hydrogen atom attached thereto. The scope of the invention also includes methods for the preparation of such fluid or oily compositions.

It was known prior to my invention that there could be produced linear polysiloxanes corresponding to the general formula I 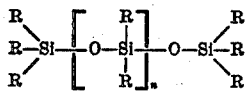

in which the various R's represent the same or different lower, monovalent hydrocarbon radicals, more particularly hydrocarbon radicals selected from the class consisting of lower alkyl, aryl, alkaryl and aralkyl radicals, and $n$ is an integer equal to at least 1. Examples of such linear polysiloxanes are octamethyltrisiloxane, decamethyltetrasiloxane, dodecamethylpentasiloxane, tetradecamethylhexasiloxane, octaphenyltrisiloxane, etc. Such linear polysiloxanes and methods of preparation are more fully described and are specifically claimed in the copending application of Winton I. Patnode, Serial No. 463,814, filed October 29, 1942, now U. S. Patent 2,469,888, issued May 10, 1949, and assigned to the same assignee as the present invention. Also disclosed and claimed in that application are liquid compositions of matter comprising a liquid mixture of organopolysiloxanes corresponding to the general formula II $\qquad R_{(2a+2)}Si_aO_{(a-1)}$ wherein R represents a methyl radical, and $a$ is a whole number equal to at least 3, and in which every oxygen atom is situated between two silicon atoms, every silicon atom is attached through oxygen to at least one other silicon atom, and each terminal silicon atom in the Si—O—Si skeletal structure is joined to three R groups. Such liquid, linear methylpolysiloxanes are characterized by the small change in viscosity with temperature which they exhibit. Their viscosity-temperature coefficients, defined as $$VTC = \frac{\eta 100 - \eta 210}{\eta 100}$$

(wherein $\eta 100$ is the viscosity in centistokes at 100° F. and $\eta 210$ is the viscosity at 210° F.), are of the order of 0.590 to 0.610.

The present invention is based on my discovery that a great improvement in the viscosity-temperature coefficient of liquid mixtures of linear methylpolysiloxanes is provided by those linear methylpolysiloxanes wherein at least some of the silicon atoms intermediate the terminal silicon atoms have a hydrogen atom attached thereto. More particularly, I have found that liquid materials comprising a mixture of different linear methylpolysiloxanes corresponding to the general formula III 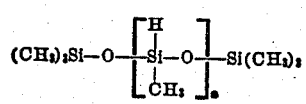

where $n$ represents an integer and is at least 1, e. g., from 10 to 500 or more, have a viscosity-temperature coefficient of the order of 0.4 to 0.5. This was quite surprising and unexpected and in no way could have been predicted. Because of this low viscosity-temperature coefficient, the liquid or oily compositions of this invention are particularly useful in lubricating, damping and other applications where they are employed in a sealed system under non-oxidizing or substantially non-oxidizing conditions and where they encounter both low and high temperature conditions during service use.

The fluid compositions of this invention may be used alone or admixed with other liquid materials, e. g., fluid bodies of the kind disclosed in the aforementioned copending Patnode application, as electrically insulating fluids, hydraulic fluids, damping fluids, lubricants, etc., especially where they are not subjected to the oxidizing influences of air. For instance, they may be admixed with (1) a liquid cyclic methylpolysiloxane corresponding to the formula $[(CH_3)_2SiO]_x$, where $x$ is a whole number and is greater than 10; or with (2) a liquid mixture of organopolysiloxanes corresponding to Formula II; or with both (1) and (2). In this way there are obtained liquid compositions having improved viscosity-temperature coefficients as compared with the liquid cyclic methylpolysiloxanes of (1) alone, or of (2) alone, or of (1) admixed with (2). These new compositions also may be admixed with various metallic soaps to form greases.

From the foregoing description it will be seen that the present invention provides liquid or fluid compositions, which are suitable for use as lubricants and for other purposes, comprising an oily mixture of linear methylpolysiloxanes at least some of which correspond to the general formula

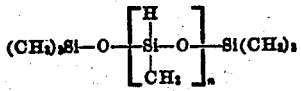

where $n$ represents an integer which is at least 1, advantageously at least 5, e. g., from 10 to 300 or 400, or even 500 or more, the said oily material containing a plurality of different linear compounds embraced by the above formula. Liquid materials composed of a plurality of different linear methylpolysiloxanes corresponding to the general formula

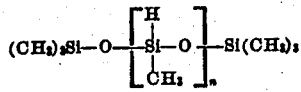

where $n$ represents an integer having an average value of at least 10 are substantially non-volatile at a temperature of the order of 200° C. at atmospheric pressure. Of particular value are fluid or oily compositions comprising a preponderant proportion, e. g., from 55 to 99% or more by weight of the composition, of different liquid linear methylpolysiloxanes the individual members of which correspond to the general formula

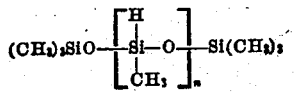

where $n$ represents an integer between 10 and 500, which compositions have a viscosity-temperature coefficient within the range of 0.4 to 0.5.

Various methods may be employed for preparing the liquid compositions of this invention, that is, fluid compositions comprising a liquid mixture of linear methylpolysiloxanes wherein at least some of the silicon atoms intermediate the terminal silicon atoms have a hydrogen atom attached thereto, more particularly one hydrogen atom and one methyl grouping. One suitable method of preparing such compositions comprises effecting a condensation reaction between (1) the product of hydrolysis of a halogenosilane corresponding to the formula

where X represents a halogen selected from the class consisting of chlorine and bromine, and (2) the product of hydrolysis of a halogenosilane corresponding to the formula

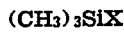

where X has the same meaning as above given. To obtain liquid materials comprising a mixture of different linear methylpolysiloxanes corresponding to Formula III (the value for $n$ in said formula being at least 1), the halogenosilanes which are hydrolyzed separately or admixed to form these hydrolyzates are employed in the ratio of more than 1 mole of $CH_3SiHX_2$ (e. g., from 2 to 500 moles thereof) for each 2 moles of $(CH_3)_3SiX$.

A more specific embodiment of the method features of my invention comprises hydrolyzing a mixture of trimethylchlorosilane (or trimethylbromosilane) and methyldichlorosilane (or methyldibromosilane), the said chlorosilanes being present in the said mixture in the ratio of about 0.40 mole of the former to at least 1 mole, usually at least 2 moles (e. g., from 3 to 100 or more moles) of the latter, and effecting a condensation reaction between the resulting mixed products of hydrolysis of the said halogenosilanes until there has been obtained a liquid or oily mixture of linear methylpolysiloxanes at least some, generally a preponderant proportion, of which correspond to the general formula

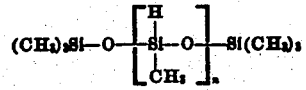

where $n$ represents an integer which is at least 5, usually at least 10. The liquid or oily mixture contains a plurality of different linear compounds embraced by the above formula.

Another method by which the fluid compositions of this invention may be prepared comprises (1) mixing together (A) hexamethyldisiloxane and (B) an oily product of hydrolysis of methyldichlorosilane or methyldibromosilane, (2) cleaving siloxane linkages of the ingredients of (A) and (B), (3) forming silanol derivatives of the cleaved compounds, and (4) effecting a condensation reaction between the said silanol derivatives, the steps of (2), (3) and (4) being carried out substantially concomitantly or simultaneously. Instead of using the entire product of hydrolysis of the dihalogenosilane, I may employ, for example, a previously isolated cyclopolysiloxane corresponding to the general formula $(CH_3SiHO)_n$, where $n$ is an integer which is at least 4 and not more than 6, or mixtures thereof, or oily hydrolyzates containing any or all of these cyclopolysiloxanes. Methylcyclopolysiloxanes embraced by the above formula are more fully described and are specifically claimed in the copending application of Robert O. Sauer, Serial No. 656,164, filed concurrently herewith and assigned to the same assignee as the present invention.

Sulfuric acid is a suitable agent for use in effecting the simultaneous or almost simultaneous reactions set forth under steps (2), (3) and (4) above. This method is more fully described in the copending application of Robert O. Sauer, Serial No. 656,163, also filed concurrently herewith and assigned to the same assignee as the present invention, and is both broadly and specifically claimed therein with particular reference to the preparation and isolation of linear polysiloxanes corresponding to the general formula

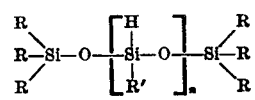

where each R represents a monovalent hydrocarbon radical, R' represents a lower alkyl radical, and $n$ represents an integer which is at least 1 and not more than 4; and specifically to the preparation and isolation of linear polysiloxanes corresponding to the general formula

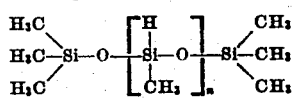

where $n$ represents an integer which is at least 1 and not more than 4.

In order that those skilled in the art better may understand how the present invention may be carried into effect, the following examples are given by way of illustration and not by way of limitation.

*Example 1*

1,3,5,7 - tetramethylcyclotetrasiloxane (0.12 mole), which had been prepared as described in the aforementioned copending application of Robert O. Sauer, Serial No. 656,164, was mixed with 0.0065 mole of hexamethyldisiloxane. A small amount of sulfuric acid, specifically 1.2 cc. of concentrated sulfuric acid (about 93–95% by weight H2SO4), was added to the mixture, and the resulting two-phase system was shaken for 18½ hours at room temperature. Five cc. of water was added, and shaking was resumed for 2 hours. The mixture was centrifuged, the oily layer separated, washed with water, centrifuged and filtered. The resulting liquid or fluid composition or lubricant was a clear, water-white oil having a viscosity of 66.1 centistokes at 100° F. and 38.7 centistokes at 210° F. Its viscosity-temperature coefficient therefore was 0.415.

Some gel was formed during the preparation of the above oily material, estimated as being about 10% of the oil, and the odor of sulfur dioxide was noticeable after treatment of the mixed reactants with sulfuric acid (equilibration step). This gel formation probably was due to the replacement of some of the hydrogen atoms by oxygen during equilibration, with the result that some cross-linking occurred.

Instead of using 1,3,5,7-tetramethylcyclotetrasiloxane as a reactant with hexamethyldisiloxane as above described, I may use any other available cyclopolysiloxane corresponding to the formula (CH3SiHO)n, where n represents an integer which is at least 4, e. g., 1, 3, 5, 7, 9-pentamethylcyclopentasiloxane, 1,3,5,7,9,11-hexamethylcyclohexasiloxane, etc. These latter compounds, as well as 1,3,5,7-tetramethylcyclotetrasiloxane, are more fully described and specifically are claimed in the aforementioned Sauer application Serial No. 656,164.

*Example 2*

A mixture of 115.5 g. (1 mole) of methyldichlorosilane and 2.5 g. (0.023 mole) of trimethylchlorosilane was run into a mixture of 250 cc. of cold concentrated hydrochloric acid (approximately 35% by weight HCl) over a period of one hour with rapid stirring. The temperature of the reaction mass rose from 1° C. (original temperature of the cold acid) to 6° C. Stirring was continued for two hours with no appearance of gel. After standing for 40 hours, a small amount of gel had formed. The oily layer was then separated from the aqueous acid phase, washed with water to remove the excess acid, centrifuged and filtered. The viscosity of the purified oil was 108 centistokes at 100° F. and 54.3 centistokes at 210° F. Its viscosity-temperature coefficient therefore was 0.498.

*Example 3*

A mixture of 80.5 g. (0.70 mole) of methyldichlorosilane and 4.7 g. (0.043 mole) of trimethylchlorosilane was run beneath the surface of 35 cc. aqueous concentrated hydrochloric acid (approximately 35% by weight HCl) with stirring. Addition was completed in 30 minutes at room temperature. The oily phase was then beaten rapidly at 6,500 R. P. M. with the acid phase for 30 minutes, separated from the acid, washed with 20 cc. of water, centrifuged and filtered. No gel was formed. The purified oil was clear and colorless, and had the cabbage-like odor characteristic of these oils. Its viscosity was 19.7 centistokes at 100° F. and 10.2 centistokes at 210° F. Its viscosity-temperature coefficient therefore was 0.481.

Oils produced as described in the foregoing examples have been found to be stable at room temperature for at least 12 months. They gel slowly in the presence of strong acid and rapidly in contact with alkali.

It will be noted that Examples 2 and 3 are illustrative of a method which comprises contacting with aqueous concentrated hydrochloric acid solution a mixture of trimethylchlorosilane and methyldichlorosilane, the said chlorosilanes being present in the said mixture in the ratio of about 0.4 mole of the former to at least 2 moles of the latter, allowing the resulting products of hydrolysis of the said chlorosilanes to intercondense in the presence of the hydrochloric acid until there has been obtained a liquid or oily material composed of a plurality of different linear methylpolysiloxanes corresponding to the general formula

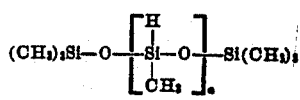

where n represents an integer having an average value of at least 10, separating the said oily material from the aqueous acid phase, and purifying the oily product thereby obtained.

What I claim as new and desire to secure by Letters Patent of the United States is:

1. A lubricant consisting essentially of an oily mixture of linear methylpolysiloxanes corresponding to the general formula

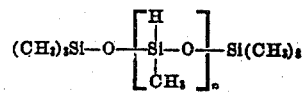

where n represents an integer which is equal to from 5 to 500, the said oily mixture containing a plurality of different linear compounds embraced by the above formula.

2. A liquid material consisting essentially of a plurality of different linear methylpolysiloxanes corresponding to the general formula

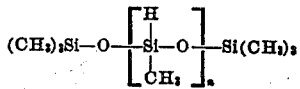

where n represents an integer having an average value of at least 10, the individual values of n being equal to from 5 to 500 the said liquid material being substantially non-volatile at a temperature of the order of 200° C. at atmospheric pressure.

3. An oily composition consisting essentially of a preponderant proportion of different liquid linear methylpolysiloxanes the individual members of which correspond to the general formula

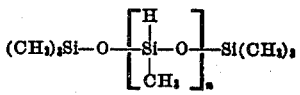

where n represents an integer between 10 and 500, said composition having a viscosity-temperature coefficient within the range of 0.4 to 0.5.

4. The method which comprises contacting at temperatures as high as room temperatures with aqueous concentrated hydrochloric acid solution a mixture of trimethylchlorosilane and methyldichlorosilane, the said chlorosilanes being present in the said mixture in the ratio of about 0.4 mole of the former to at least 2 moles of the latter, allowing the resulting products of hydrolysis of the said chlorosilanes to intercondense in the presence of the hydrochloric acid until there has been obtained an oily material composed of a plurality of different linear methylpolysiloxanes corresponding to the general formula

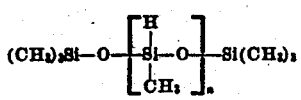

where $n$ represents an integer having an average value of at least 10, the individual values of $n$ being equal to from 5 to 500 separating the said oily material from the aqueous acid phase, and purifying the oily product thereby obtained.

DONALD F. WILCOCK.

REFERENCES CITED

The following references are of record in the file of this patent:

UNITED STATES PATENTS

| Number | Name | Date |
|---|---|---|
| 2,258,220 | Rochow | Oct. 7, 1941 |
| 2,265,962 | Bent et al. | Dec. 9, 1941 |
| 2,306,222 | Patnode | Dec. 22, 1942 |
| 2,383,521 | Sowa | Aug. 28, 1945 |
| 2,386,259 | Norton et al. | Oct. 9, 1945 |
| 2,386,441 | Daudt | Oct. 9, 1945 |
| 2,390,518 | Daudt | Dec. 11, 1945 |
| 2,410,346 | Hyde | Oct. 29, 1946 |